(12) United States Patent
Kern

(10) Patent No.: US 9,522,707 B2
(45) Date of Patent: Dec. 20, 2016

(54) TRANSPORT VEHICLE WITH VARIABLE WIDTH AND TRACK WIDTH AND AT LEAST ONE STEERING AXLE

(71) Applicant: SCHEUERLE FAHRZEUGFABRIK GMBH, Pfedelbach (DE)

(72) Inventor: Florian Kern, Pfedelbach (DE)

(73) Assignee: SCHEUERLE FAHRZEUGFABRIK GMBH, Pfedelbachk (DE)

( * ) Notice: Subject to any disclaimer, the term of this patent is extended or adjusted under 35 U.S.C. 154(b) by 0 days.

(21) Appl. No.: 14/649,340

(22) PCT Filed: Dec. 12, 2013

(86) PCT No.: PCT/EP2013/003755
§ 371 (c)(1),
(2) Date: Jun. 3, 2015

(87) PCT Pub. No.: WO2014/090407
PCT Pub. Date: Jun. 19, 2014

(65) Prior Publication Data
US 2015/0284041 A1    Oct. 8, 2015

(30) Foreign Application Priority Data

Dec. 12, 2012 (DE) .................. 10 2012 024 247
Dec. 12, 2012 (DE) .................. 20 2012 011 898 U
Sep. 19, 2013 (DE) .................. 20 2013 008 269 U

(51) Int. Cl.
*B62D 53/06* (2006.01)
*B62D 7/20* (2006.01)
(Continued)

(52) U.S. Cl.
CPC ............. *B62D 53/067* (2013.01); *B60B 11/00* (2013.01); *B60B 35/003* (2013.01); *B60B 35/04* (2013.01);
(Continued)

(58) Field of Classification Search
CPC ..... B62D 21/14; B62D 53/067; B62D 63/061; B62D 53/06; B60B 35/1054; B60B 11/02; B60B 35/1027
See application file for complete search history.

(56) References Cited

U.S. PATENT DOCUMENTS 3,339,942 A    9/1967 Ratkovich
3,467,408 A *  9/1969 Louis .................. B60B 35/1027
                                          280/423.1
(Continued)

FOREIGN PATENT DOCUMENTS

DE    1958197 A    6/1970
DE    2253956 A    9/1973
(Continued)

OTHER PUBLICATIONS

International Search Report miled Mar. 6, 2014; PCT/EP2013/003755.

*Primary Examiner* — Hau Phan
(74) *Attorney, Agent, or Firm* — Ladas & Parry LLP

(57) ABSTRACT

The invention relates to a transport vehicle having variable width and track width, a chassis (14) and at least one steering axle (16, 18, 20, 22), wherein the chassis (14) comprises two chassis parts (28) each carrying a row of bogies (60) arranged one after the other and are adjustable transverse to a vertical longitudinal medium plane (26) of the transport vehicle. According to the invention only a single longitudinally adjustable transverse track rod (72) is arranged between the two rows of bogies (60) connecting two bogies (60) of the one or the other steering axle (16, 18, 20, 22) and which length is adjustable according to a degree of enlargement or reduction of the width and track width.

17 Claims, 12 Drawing Sheets

Figure 1:
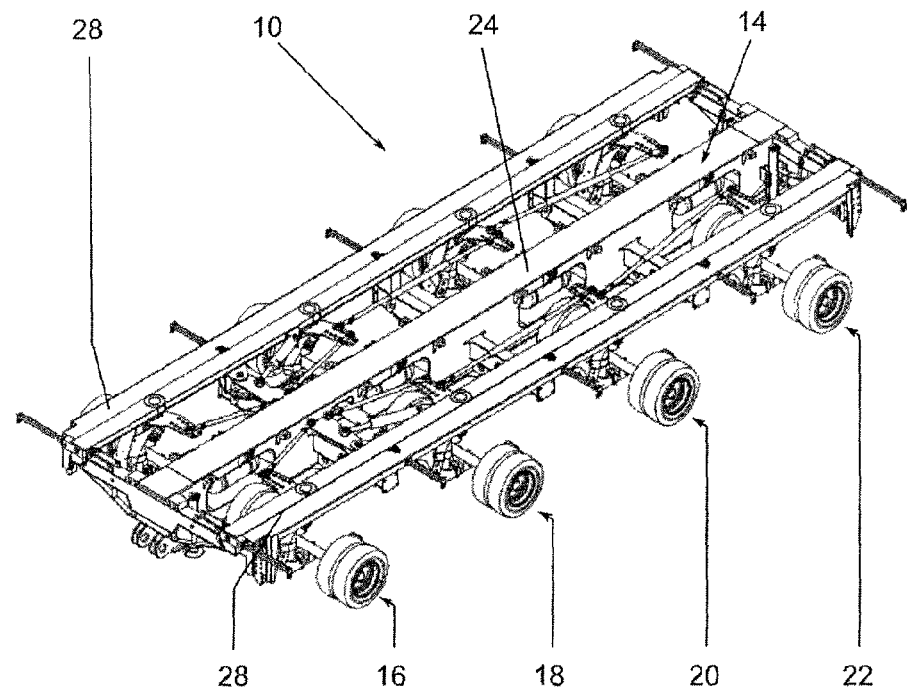

(51) Int. Cl.

| | | |
|---|---|---|
| *B60B 35/10* | (2006.01) | |
| *B60G 7/02* | (2006.01) | |
| *B62D 21/14* | (2006.01) | |
| *B62D 21/20* | (2006.01) | |
| *B60B 11/00* | (2006.01) | |
| *B60B 35/00* | (2006.01) | |
| *B60D 1/06* | (2006.01) | |
| *B60D 1/14* | (2006.01) | |
| *B60D 1/24* | (2006.01) | |
| *B60D 1/46* | (2006.01) | |
| *B60P 1/00* | (2006.01) | |
| *B60B 35/04* | (2006.01) | |
| *B62D 63/06* | (2006.01) | |

(52) U.S. Cl.
CPC ............... *B60B 35/10* (2013.01); *B60D 1/06* (2013.01); *B60D 1/14* (2013.01); *B60D 1/143* (2013.01); *B60D 1/246* (2013.01); *B60D 1/247* (2013.01); *B60D 1/465* (2013.01); *B60G 7/02* (2013.01); *B60P 1/00* (2013.01); *B62D 7/20* (2013.01); *B62D 21/14* (2013.01); *B62D 21/20* (2013.01); *B62D 53/061* (2013.01); *B62D 63/061* (2013.01); *B62D 63/068* (2013.01); *B60G 2300/36* (2013.01); *B60G 2300/40* (2013.01); *B60Y 2200/40* (2013.01)

(56) References Cited

U.S. PATENT DOCUMENTS

| | | | | |
|---|---|---|---|---|
| 3,556,545 A | * | 1/1971 | Van Raden | ......... B60B 35/1054 280/423.1 |
| 3,697,098 A | * | 10/1972 | Fisher | ............ B62D 21/14 280/404 |
| 4,119,224 A | * | 10/1978 | Moody | ............... B60P 3/07 280/656 |
| 4,221,398 A | | 9/1980 | Pautrat | |
| 4,358,133 A | * | 11/1982 | Stucky | ............ B60P 3/066 180/9.48 |
| 4,359,123 A | | 11/1982 | Haupt et al. | |
| 4,570,967 A | * | 2/1986 | Allnutt | ............ B62D 53/067 280/656 |
| 4,772,038 A | | 9/1988 | MacDonald | |
| 4,981,318 A | * | 1/1991 | Doane | ............... B60P 3/14 296/182.1 |
| 5,118,245 A | | 6/1992 | Dunkel | |
| 5,326,128 A | | 7/1994 | Cromley, Jr. | |
| 5,419,577 A | * | 5/1995 | Murray | ............... B60P 3/06 280/656 |
| 6,120,235 A | * | 9/2000 | Humphries | ............ B60P 3/12 280/656 |
| 6,746,040 B2 | * | 6/2004 | Bordeleau | ............ B62D 63/061 280/656 |
| 6,986,519 B2 | * | 1/2006 | Smith | ............... B60G 3/14 180/291 |
| 2012/0223570 A1 | * | 9/2012 | Chien | ............... B60B 11/02 301/36.2 |

FOREIGN PATENT DOCUMENTS

| | | |
|---|---|---|
| DE | 2219447 A1 | 12/1973 |
| EP | 1150876 B1 | 11/2001 |

\* cited by examiner

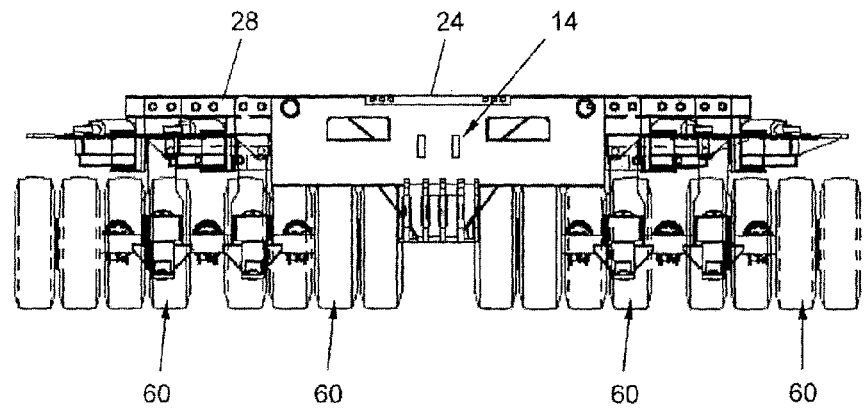
Fig. 25
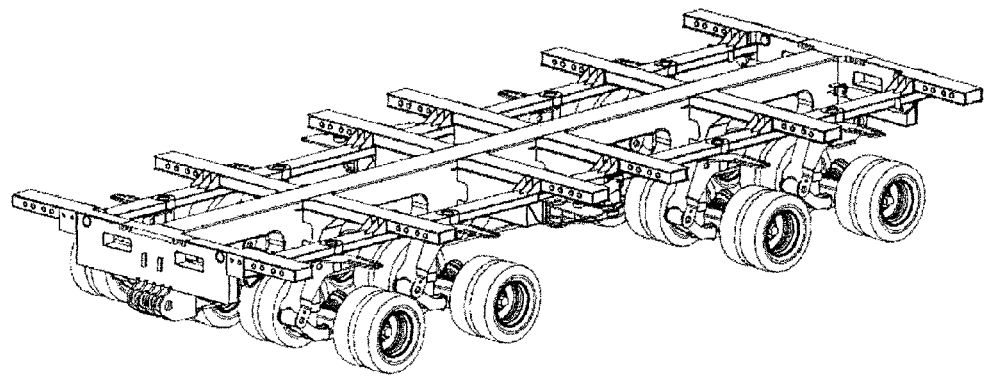

TRANSPORT VEHICLE WITH VARIABLE WIDTH AND TRACK WIDTH AND AT LEAST ONE STEERING AXLE

The invention relates to a transport vehicle with variable width and width track, having a chassis and at least one steering axis with two bogies according to the preamble of claim 1. The invention relates particularly to a low-loader with variable width and track width.

For transporting of loads having an exceptional width or for return transportation without load, it is of advantage if the width and track width of the vehicle used for transportation can be varied. Besides, there are federal states in the USA with special legal provisions for transport vehicles for transporting loads with an exceptional width, for which the allowed load per axle is limited as a function of the track width of the vehicle, so that a variable track width is an advantage to fulfill the legal provisions and to utilize the maximum possible axle load.

Transport vehicles having a width and track width, which can be varied if required, are for example known from U.S. Pat. No. 4,772,038, U.S. Pat. No. 5,118,245 or U.S. Pat. No. 5,326,128. Further, U.S. Pat. No. 3,339,942 discloses a flat bed trailer with variable track width, whose width can be reduced for unloaded drives. The flat bed trailer has two pairs of rigid axles, the front axle pair is connected rotatably with the tractor via a first goose-neck and the rear axle pair is rotatably connected with the first goose-neck via a second goose-neck, to improve the maneuverability of the flat bed trailer. However, in this manner only a limited improvement of the maneuverability is possible.

From U.S. Pat. No. 4,221,398 a transport vehicle as mentioned before in form of a drawbar trailer and a flat bed trailer with multiple steering axles is known, whose width and track width, if required, can be increased or decreased, by moving two chassis parts apart or together transverse to the driving direction or to a vertical longitudinal median plane of the transport vehicle, the chassis parts each carrying a row of bogies. The bogies of each steering axle are steered independently from each other by means of separated steering cylinders, which are arranged in each of the two chassis parts. Thus, however relatively many steering cylinders are needed for the steering. On the other hand it cannot be assured, that during the steering the steering angle of the two bogies of the steering axle and thus the turning angle of the corresponding wheels or wheel pairs have a desired ratio.

DE 2 219 447 A discloses a similar transport vehicle in the form of a low-loader with two transverses or longitudinal carriers, which carry a row of steerable bogies arranged one after the other, as well as with two pulling devices. To steer simultaneously the bogies of both transverses during the steering, in total four lockable and telescopable track rods are provided, which are arranged pairwise between each of the pulling devices and the bogies of the adjacent steering or swivel axle. This means however, that with each adjustment of the width and track width of the low-loader the length of all four telescoping track rods has to be adjusted and after the adjustment one has to lock again, thus causing huge setup times. Additionally, the telescopable track rods have an angle with the longitudinal axis of the vehicle being unequal to 90 degrees, which changes even more during the adjustment of the width and track width of the low-loader, so that the amount of the necessary length adjustment of the track rods does not correspond to the amount of the adjustment of the track width, but has to be calculated for the different track widths as a function of the angular position of the track rods. Moreover, the turning of a pulling device for the low loader leads to different angle orientations of the two track rods, both arranged of the side of the pulling device, so that for transfer of the swivel movement of the pulling device onto the two bogies of the adjacent steering or swing axle, despite relative complex kinematics, questionable although the steering angles of these two bogies are identical.

DE 22 53 956 A1, DE 19 58 197 A1, EP 1 150 876 A2, and U.S. Pat. No. 4,359,123 A disclose the use of length-adjustable transverse track rods between two wheels of a steering axis.

Starting from here, it is an object of the invention, to improve a transport vehicle of the before-mentioned kind having a variable width and track width, so that not only identical steering angles of the two bogies of each steering axle and therefore identical turning angles of the corresponding wheels or wheel pairs are ensured, with simple measures and with low effort during the steering, but also the setup times and the workload during the adjustment of the width and the track width can be reduced.

The solution of this object is achieved according to the invention out by a transport vehicle with the features of claim 1. Advantageous embodiments result from the dependent claims.

According to the invention, only one single transverse track rod with an adjustable length is provided, independently of the number of steering axles, so that the time and workload for adjusting the length of the transverse track rod during a change of the width or of the track width of the transport vehicle can be minimized.

According to the feature combination of the invention it can be additionally ensured, that during the steering the bogies and thus all wheels or wheel pairs of each steering axle, regardless of the respectively set track width, can be turned by identical steering or turning angles.

In order to increase the maneuverability of the transport vehicle, it comprises a plurality of steering axis, wherein both frame parts carry a series of bogies, which are arranged in line along the frame parts.

As already explained, the bogies of both rows are connected via a single length-adjustable transverse track rod. The transverse track rod connects advantageously two steering arms, each of them being arranged pivotably in one of the two frame parts and being connected rotably fixed with one bogie carried by a frame part.

In order to ease the length adjustment of the transverse track rod, a preferred embodiment of the invention provides, that the transverse track rod comprises at least two parts, which are movable in relation to each other in the direction of a longitudinal axis of the transverse track rod and which can be fixed immovably in predefined displacement positions, wherein the distances between the predetermined displacement positions or the length differences of the transverse track rod, respectively, in the predetermined displacement positions corresponds to the degree of the desired enlargement or reduction of the track width. Preferably the transverse track rod is telescopable and consists of at least two tube-like elements slid into one another, best being co-axial cylinder tubes, which can be pulled apart in direction of a longitudinal axis of the transverse track rod.

For this multiple, preferably three different discrete widths and track widths can be set at the transport vehicle, in which case the transverse track rod, according to an advantageous embodiment of the invention, comprises multiple, advantageously three co-axial tube-like elements, which are displaceable in relation to each other in direction of their longitudinal axes and can be fixed in relation to each other in different displacement positions, in which either all tube-like elements are slid together or one or more tube-like elements are pulled apart.

The fixing of the tube-like elements in relation to each other is performed advantageously by means of bolts, which extend through aligned transverse bore holes of at least two of the tube-like elements. In this manner only one bolt needs to be pulled out from two aligned transverse bore holes for length adjustment of the transverse track rod, and after the shortening or lengthening of the transverse track rod via telescoping of the tube-like elements the bolt is again pushed through two aligned transverse bore holes and is secured.

A further advantageous embodiment of the invention provides, that the two steering arms connected to each other via the transverse track rod are hinged between two adjacent bogies at one of the chassis parts, respectively, and are advantageously connected with a steering cylinder. The steering cylinders serve for pivoting of the steering arms in relation to the chassis parts, to rotate the bogies of the steering axle or the steering axles and thus turn the wheels.

Both steering arms connected to each other via the transverse track rod are arranged between two steering axles, for example between a first and a second steering axle, wherein each of the two steering arms is connected by at least one longitudinal track rod with a steering arm of the corresponding bogie of the same row, for example the first and the second bogie.

The steering arm of a bogie, for example of the second bogie, of each row is advantageously connected via a further longitudinal track rod with a steering arm of a following bogie, for example of the third bogie in this row, which again is connected via a further longitudinal track rod with a steering arm of a further bogie, for example of the fourth bogie of each row, so that the number of steering axles of the transport vehicle can be adjusted in a modular manner as required, without that more than a single length-adjustable transverse track rod is required or without that the length of more than one transverse track rod needs to be adjusted for an adjustment of the track width.

Advantageously the transmission ratio of the steering transmission for the steering arms which are connected via the transverse track rod is larger as for the other steering arms of the transport vehicle, so that due to the larger lever arm the force required for steering is lower and thus steering cylinders with a smaller diameter can be used.

Preferably the steering arms of adjacent steering axles, being connected to each other via longitudinal track rods, provide respectively a plurality of holes for mounting the longitudinal track rods, which are arranged in different distances from the rotating axis of the bogies, so that by the selection of a suitable hole a desired steering transmission for the bogies of each steering axle can be selected and thus the correct steering angle in relation to a joint steering pole can be set for the bogies of the different steering axes, respectively. The engagement point of the longitudinal track rods at the steering arms and the steering transmission caused thereby is chosen such, that the bogies being at the inner side of a curve of the foremost and rearmost steering axle have the largest steering angle.

It is also possible, to connect steering arms of two bogies of at least one steering axle directly via a length-adjustable transverse track rod, if identical steering angle are to be set at the bogies.

As transport vehicles used for the transporting of heavy loads have a relatively high empty weight, a further advantageous embodiment of the invention provides that the transport vehicle comprises means for lifting the chassis, so that the wheels or wheel pairs of the transport vehicle can be lifted from the ground before changing the track width or width, to ease the sideways displacement of the two chassis parts by a huge reduction of the friction drag. The means for lifting the chassis comprise advantageously a plurality of vertical hydraulic supports, which work like a hydraulic car jack.

For a sideways displacement of the two side chassis parts in relation to a center chassis part advantageously at least one mobile hydraulic cylinder is used, which can be applied alternately between the center chassis part and one of the two side chassis parts to move both side chassis parts one after the other in the direction of the center chassis part or away from it, when the chassis is in a lifted position.

An advantageous embodiment of the invention provides, that the transport vehicle has transverse carriers which connect the center chassis part with at least one of the two side chassis parts. These are formed, according to a first alternative, telescopable. A second alternative of the invention provides that the transverse carriers have a defined length and that the one or the more side chassis parts are displaceable along the transverse carriers.

According to a further advantageous embodiment of the invention, the transport vehicle comprises at least one modular load-carrying part and a goose-neck, which is connected or connectable to the load-carrying part, whose width is adjustable, according to the degree of the enlargement or reduction of the track width. Advantageously, the gooseneck provides a coupling part which is releasably connectable with the load-carrying part, whose coupling part comprises two side parts which are adjustable transversely to the longitudinal center plane of the transport vehicle and which are rigidly connectable with the chassis parts.

In the following the invention is explained in more detail according to two embodiments shown in the Figures.

Figure 2:
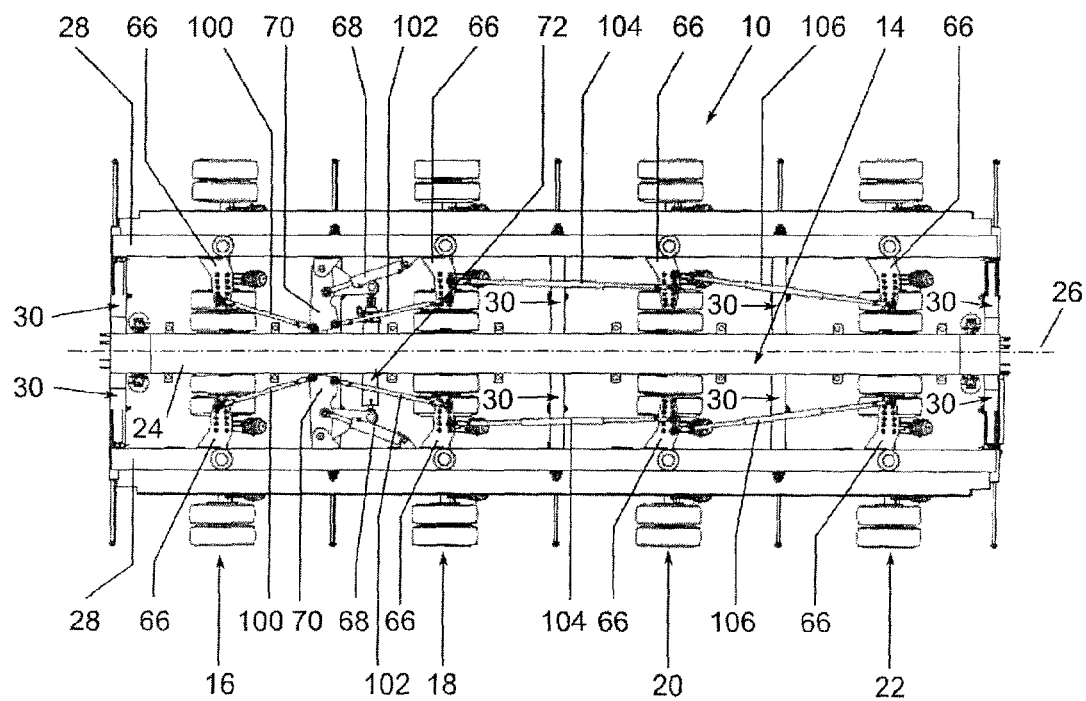
Figure 3:
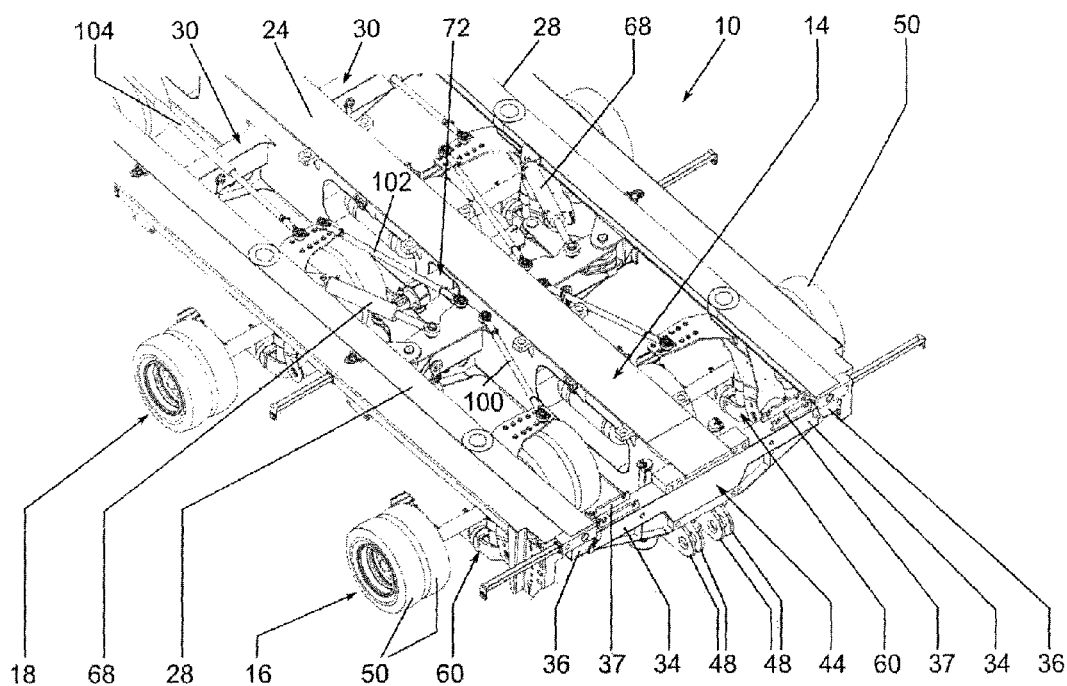
Figure 4:
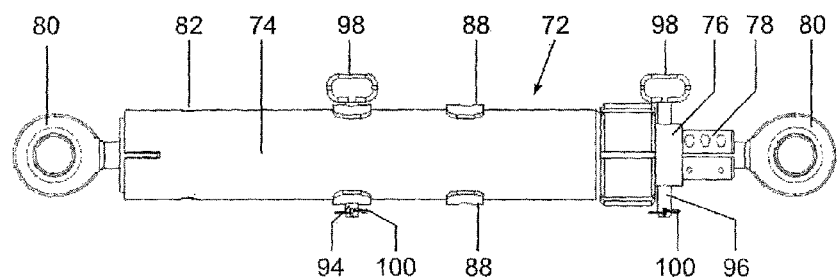
Figure 5:
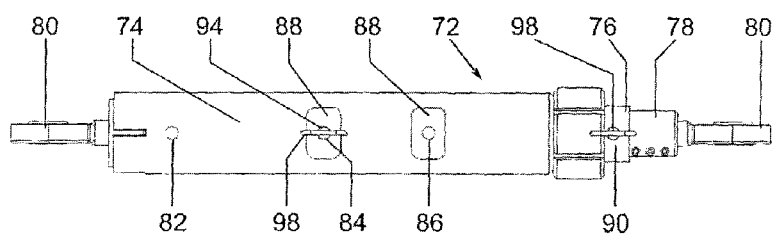
Figure 6:
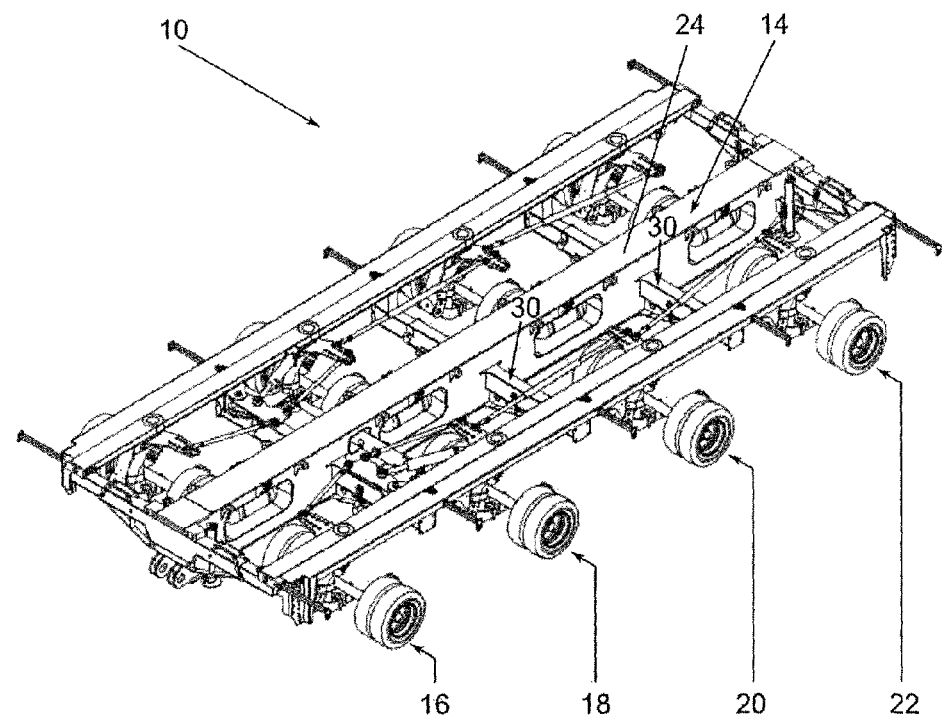
Figure 7:
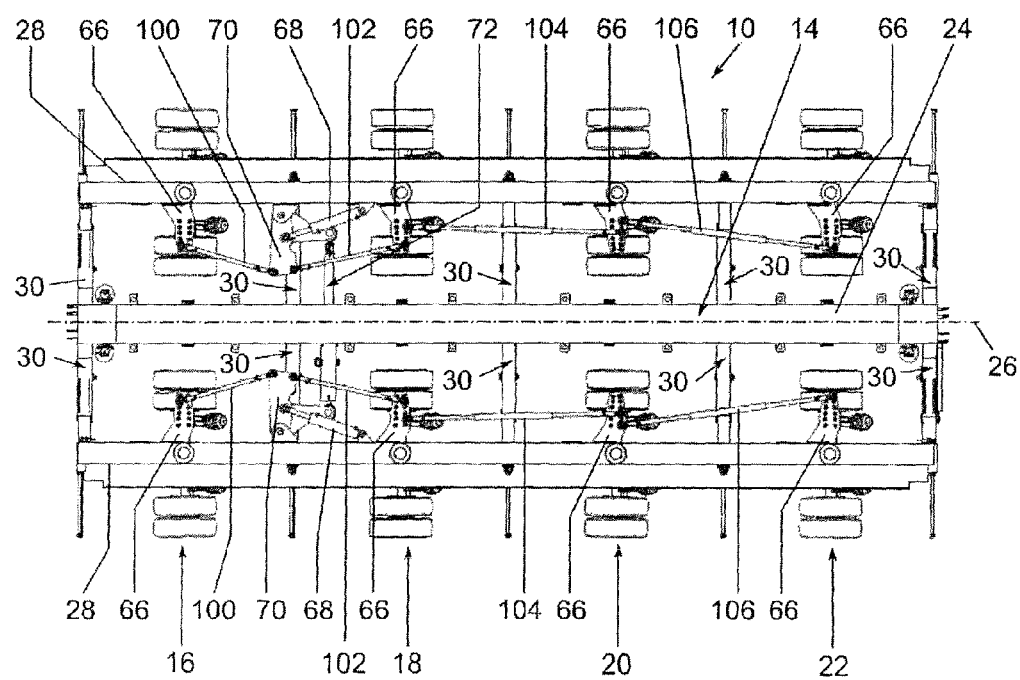
Figure 8:
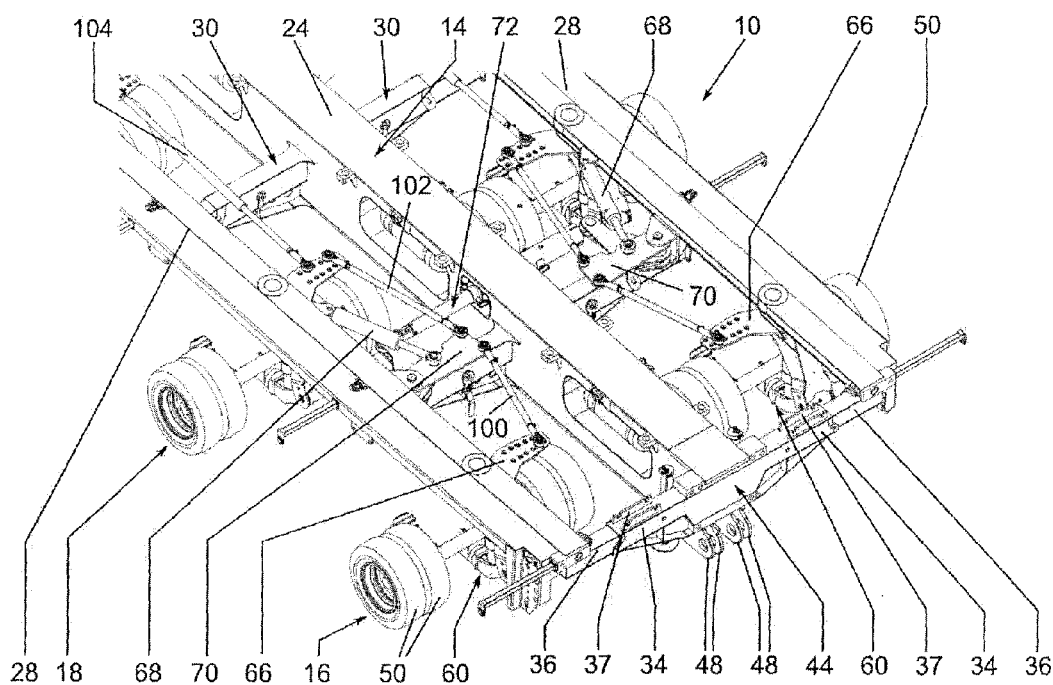
Figure 9:
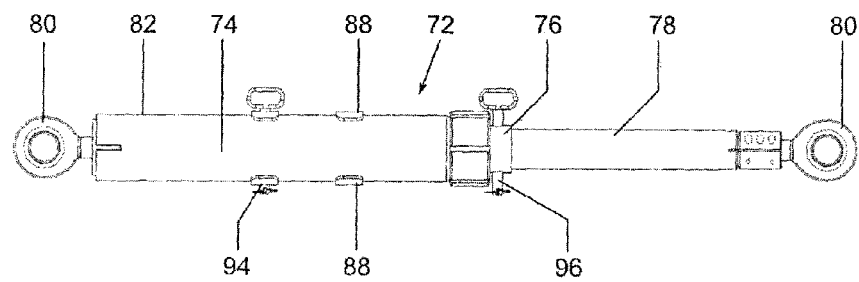
Figure 10:
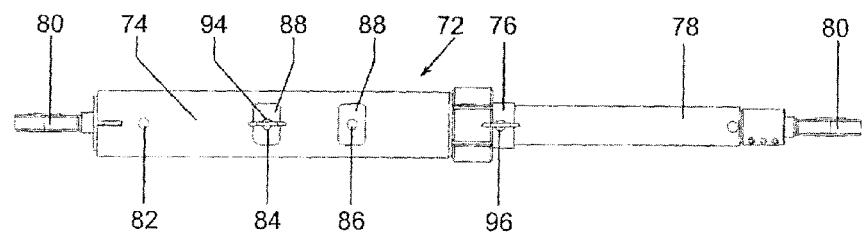
Figure 11:
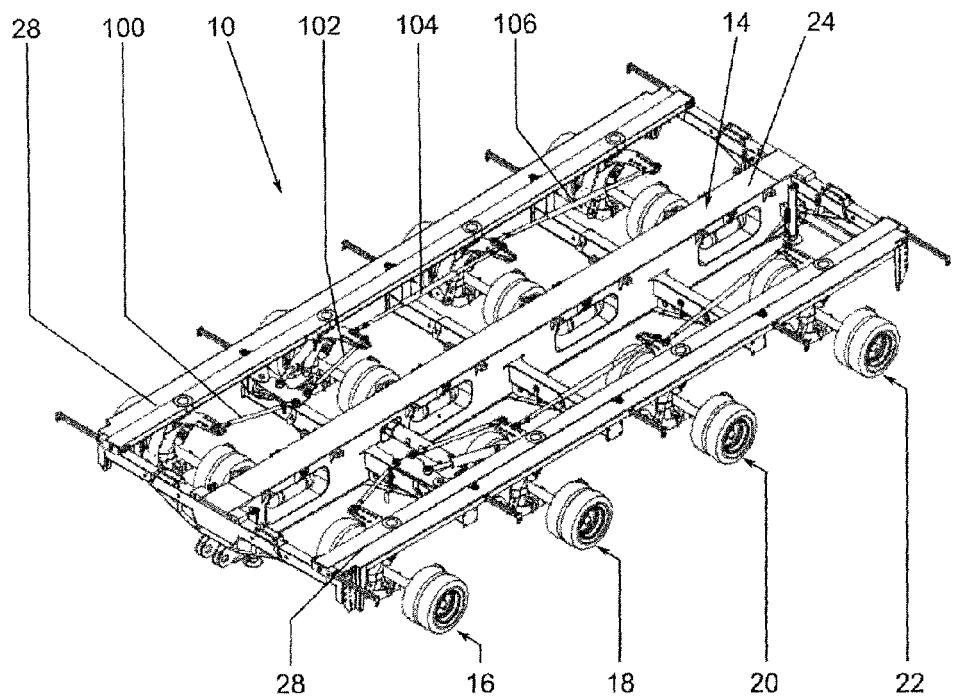
Figure 12:
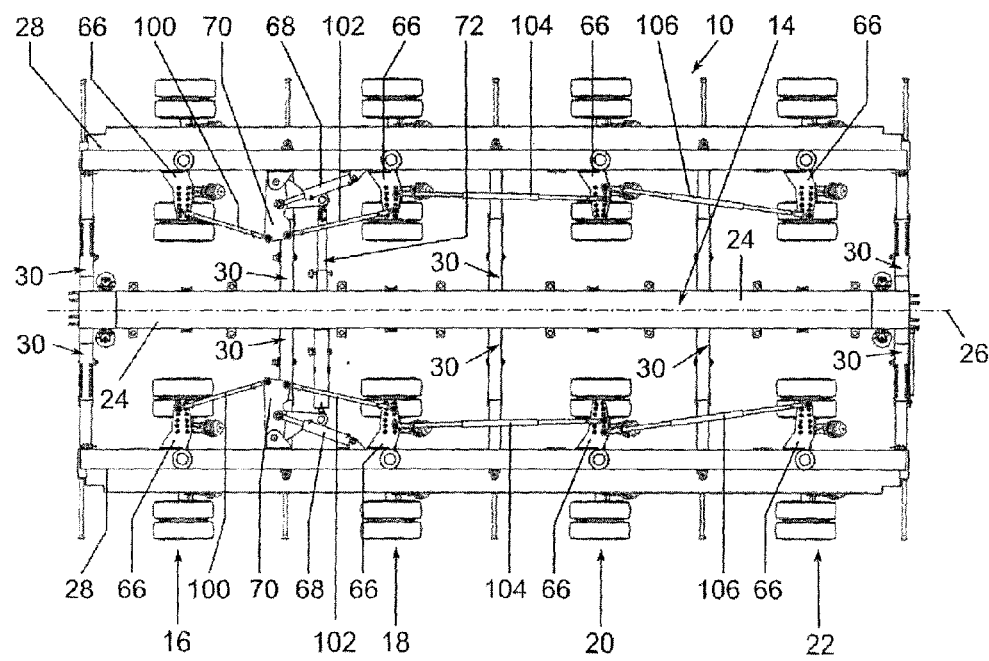
Figure 13:
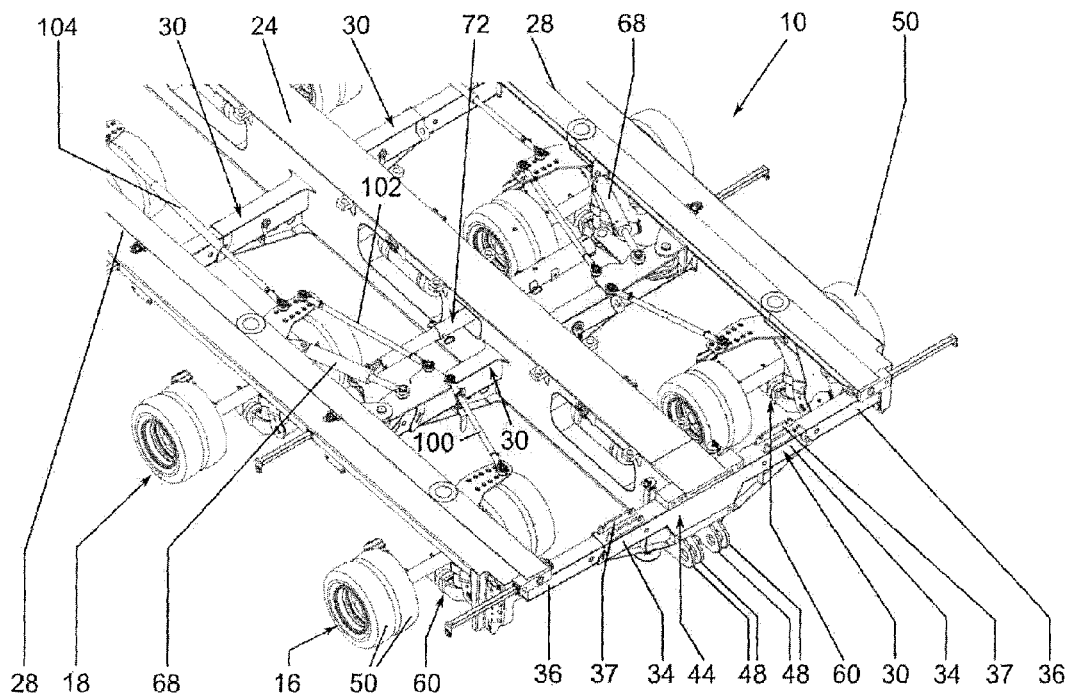
Figure 14:
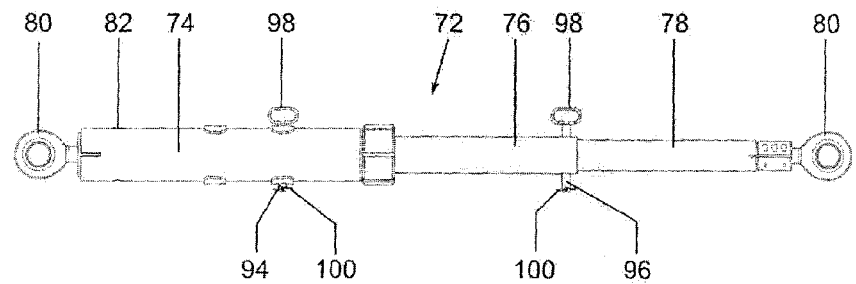
Figure 15:
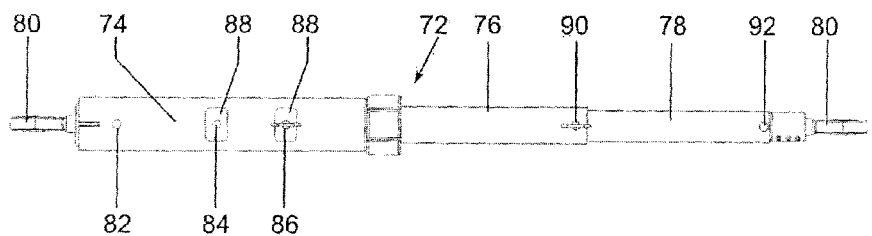
Figure 16:
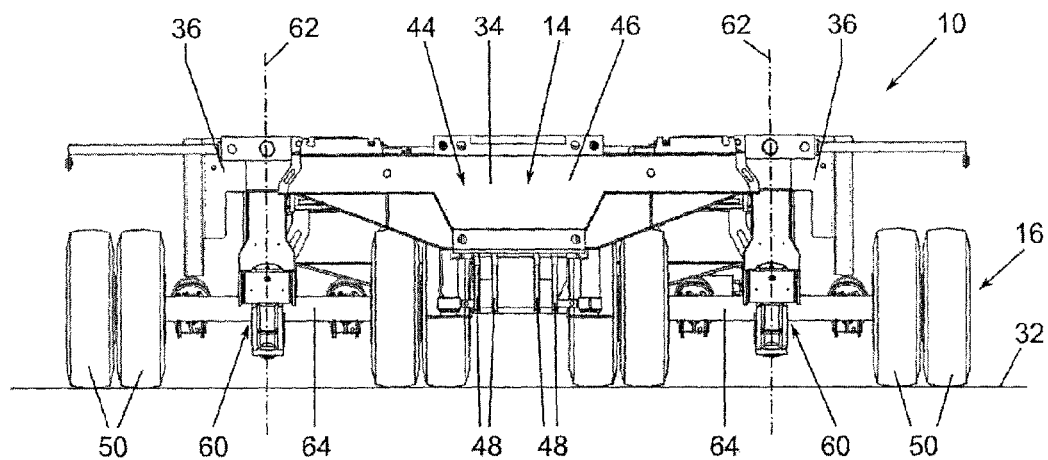
Figure 17:
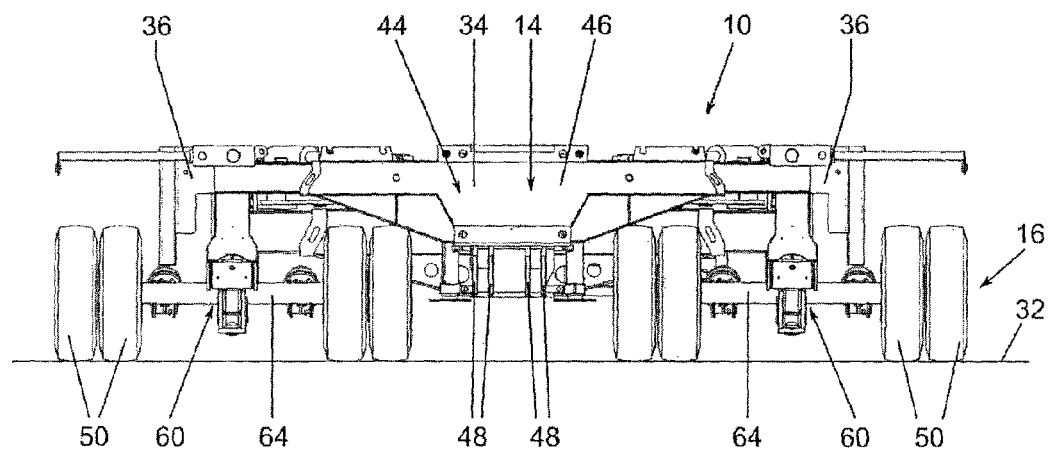
Figure 18:
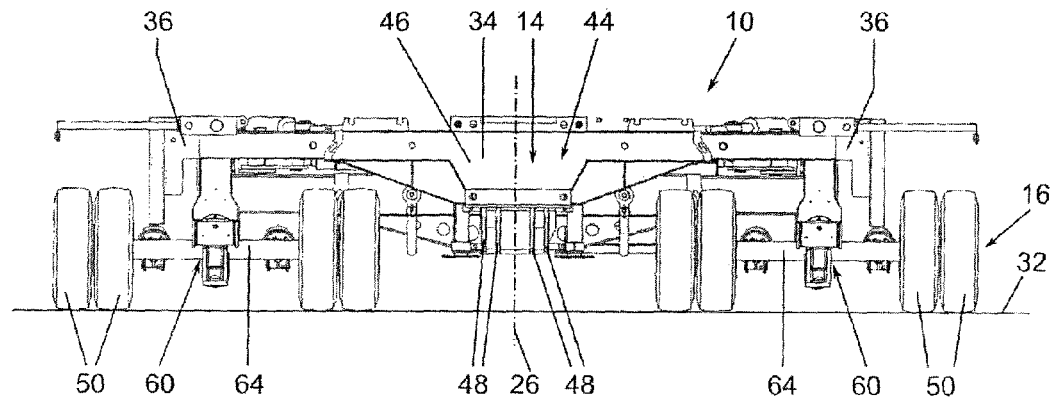
Figure 19:
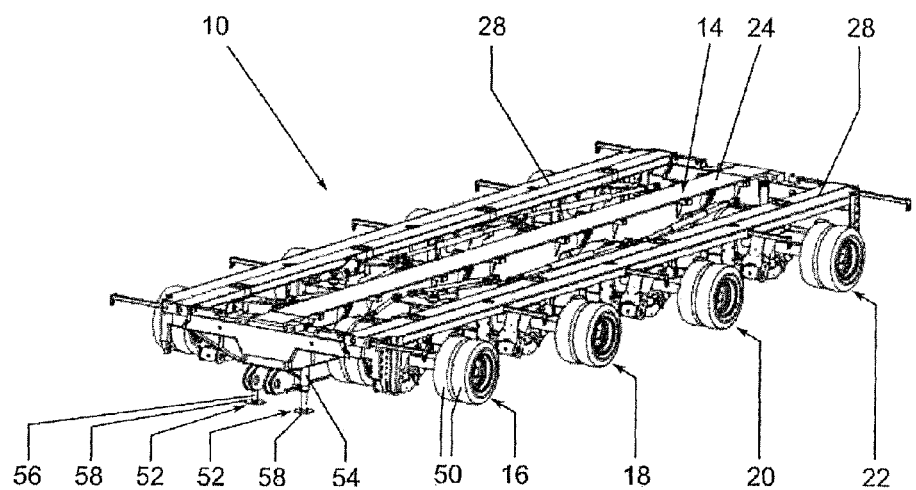
Figure 20:
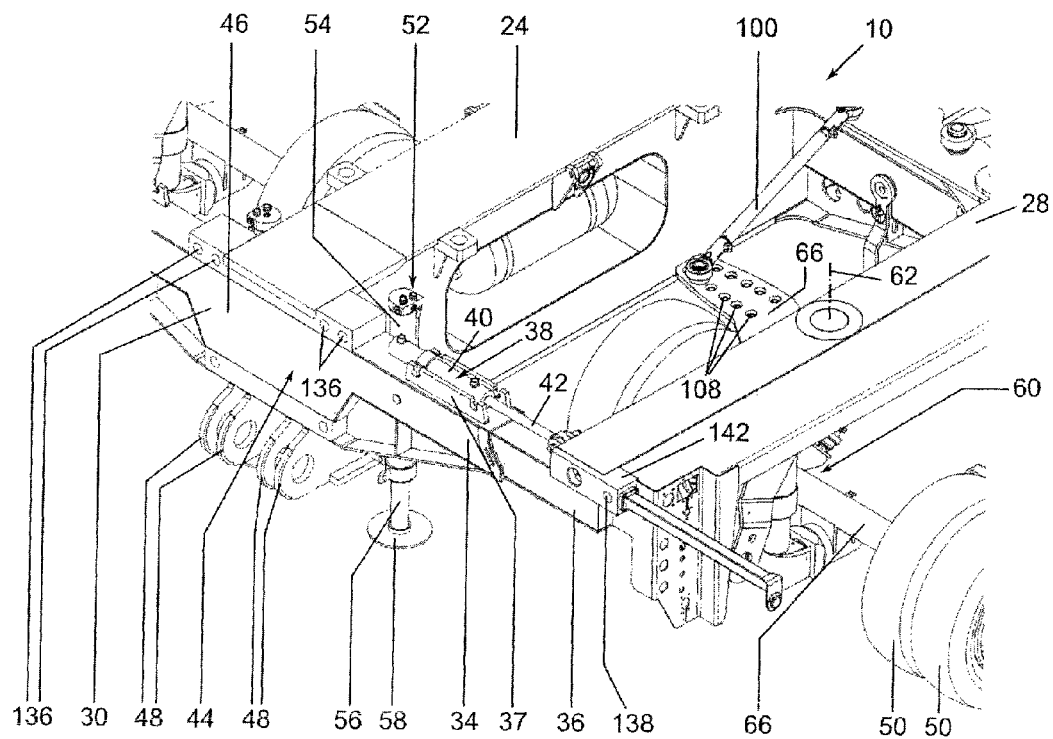
Figure 21:
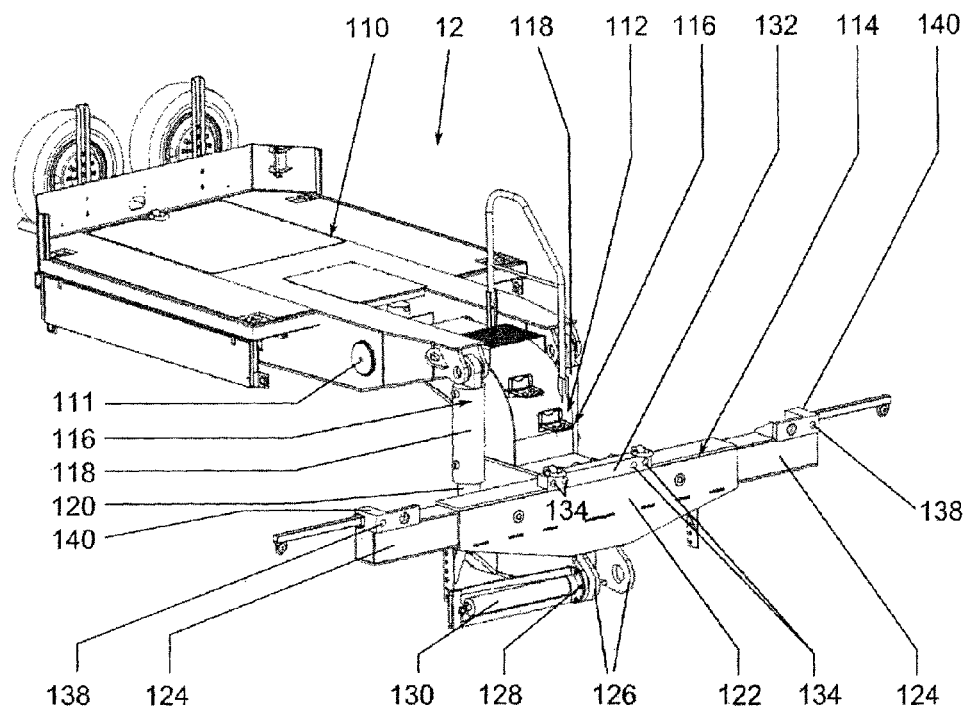
Figure 22:
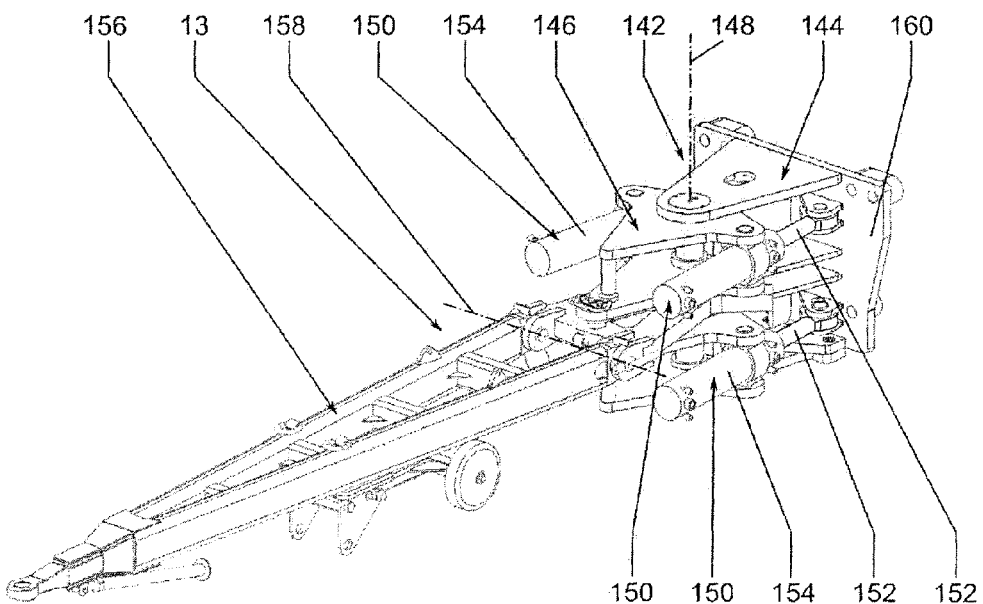
Figure 23:
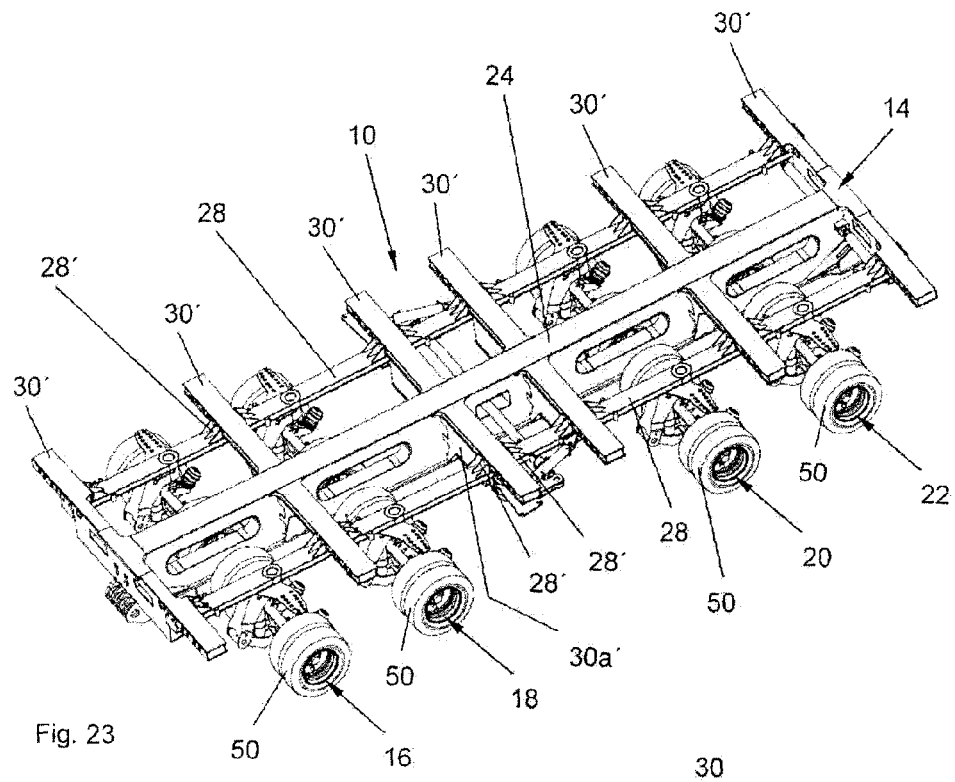
Figure 24:
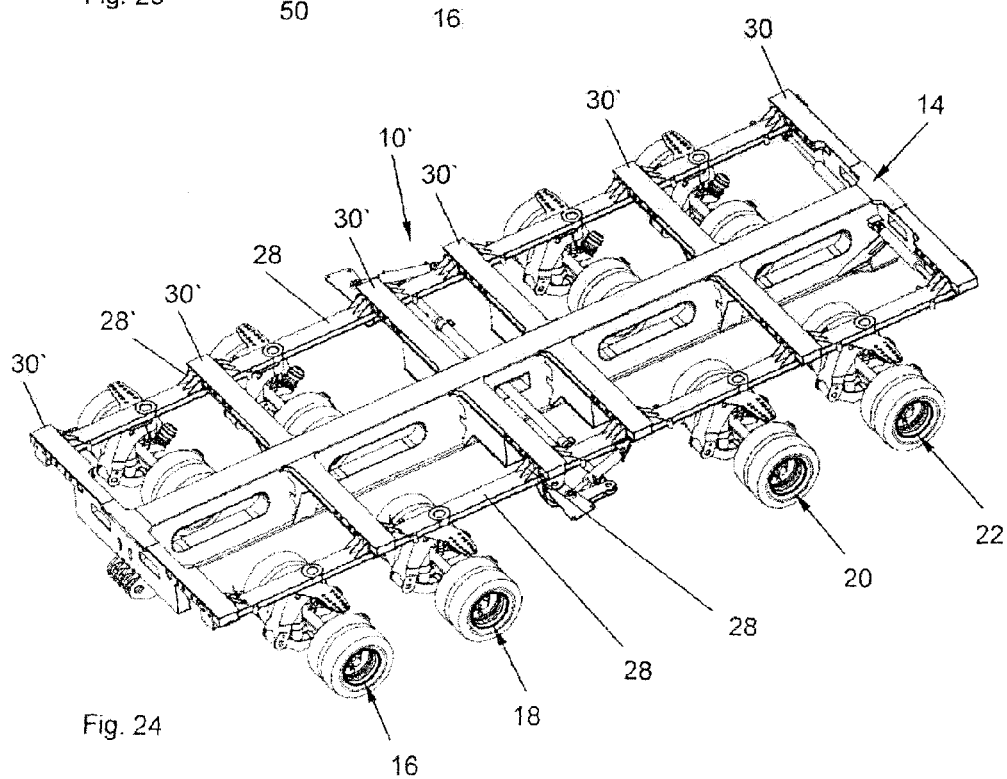
Figure 27:
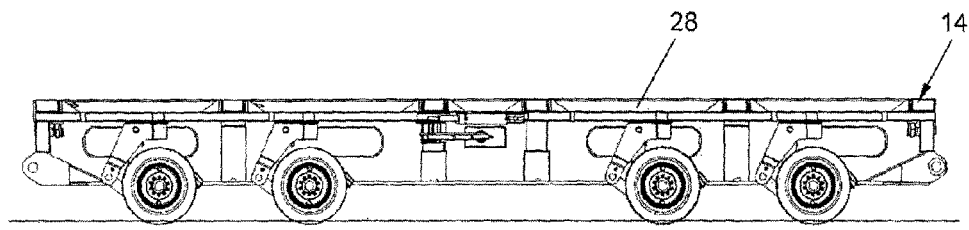
Figure 26:
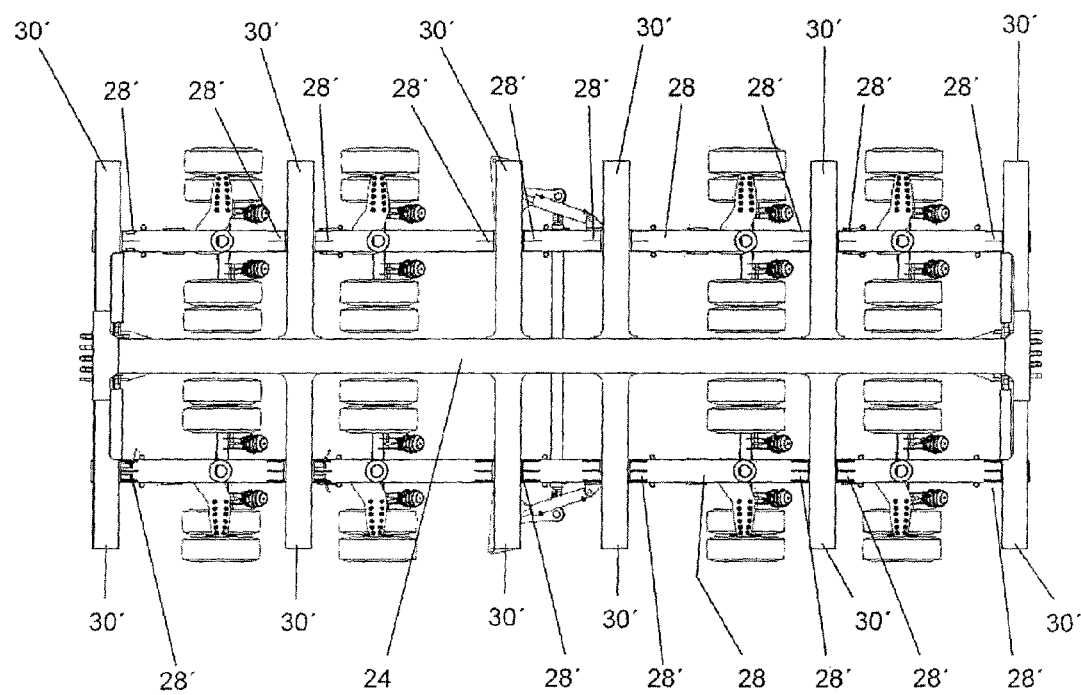

FIG. 1: shows a perspective view of a load-carrying part of a transport vehicle with variable width and track width at its narrowest width and track width setting, according to a first embodiment;

FIG. 2: shows a top view of the load-carrying part of the transport vehicle at the narrowest width and track width setting;

FIG. 3: shows a partially cut away perspective view of a front end section of the load-carrying part at the narrowest width and track width setting;

FIG. 4: shows a top view of a transverse track rod of the load-carrying part at the narrowest width and track width setting, viewed in a mounting position;

FIG. 5: shows a front view of the transverse track rod of FIG. 4, viewed in the mounting position;

FIG. 6: shows a view corresponding to FIG. 1, however at a medium width and track width setting;

FIG. 7: shows a view corresponding to FIG. 2, however at a medium with and track width setting;

FIG. 8: shows a view corresponding to FIG. 3, however at a medium width and track width setting;

FIG. 9: shows a view corresponding to FIG. 4, however at a medium width and track width setting;

FIG. 10: shows a view corresponding to FIG. 5, however at a medium width and track width setting;

FIG. 11: shows a view corresponding to FIGS. 1 and 6, however at a widest width and track width setting;

FIG. 12: shows a view corresponding to FIGS. 2 and 7, however at a widest width and track width setting;

FIG. 13: shows a view corresponding to FIGS. 3 and 8, however at a widest width and track width setting;

FIG. 14: shows a view corresponding to FIGS. 4 and 9, however at a widest width and track width setting;

FIG. 15: shows a view corresponding to FIGS. 5 and 10, however at a widest width and track width setting;

FIG. 16: shows a front end view of the load-carrying part at the narrowest width and track width setting;

FIG. 17: shows a front end view of the load-carrying part at the medium width and track width setting;

FIG. 18: shows a front end view of the load-carrying part at the widest width and track width setting;

FIG. 19: shows a perspective view of the load-carrying part, however in a position raised from the ground for adjustment of the width and track width;

FIG. 20: shows an enlarged perspective view of the front end section of the load-carrying part of FIG. 19;

FIG. 21: shows a perspective view of a goose-neck of the low-loader connectable to the load-carrying part;

FIG. 22: shows a perspective view of a drawbar alternatively connectable with the load-carrying part;

FIG. 23: shows a perspective view of the load-carrying part of a transport vehicle with variable width and track width at its narrowest width and track width setting according to a second embodiment;

FIG. 24: shows a perspective view of the load-carrying part of FIG. 23 at its widest width and track width setting;

FIG. 25: shows a front view of the load-carrying part according to FIGS. 23 and 24;

FIG. 26: shows a top view of the load-carrying part of the second embodiment;

FIG. 27: shows a side view of the load-carrying part of the second embodiment.

In FIGS. 1 to 22 an embodiment of a transport vehicle is shown, the transport vehicle is designated for a transportation of heavy-loads with exceptional width, such as machine housings or tower segments of wind turbines. Here the transport vehicle is a low-loader, whose width and track width can be adjusted, so that, among others, the legal provisions for heavy-load vehicles with exceptional width in some federal states of the USA can be met and the maximum possible axle load can be utilized.

The low-loader comprises a load-carrying part 10, shown in the FIGS. 1 to 3, 6 to 8, 11 to 13 and 16 to 20 in different width and track width settings, and either a goose-neck 12 shown in FIG. 21 or a drawbar 13 shown in FIG. 22, which alternatively can be attached at a front end of the load-carrying part 10 and which serve to couple the load-carrying part 10 with a tractor (not shown).

Depending on the weight and length of the heavy-load to be transported, the low-loader can, apart from the shown load-carrying part 10, comprise at least a further load-carrying part with variable width and track width, which is coupled with the rear end of the shown load-carrying part 10. The further load-carrying part has an essentially identical design as the shown load-carrying part 10, however it can have a different number of axles and a shorter length or a greater length.

As best shown in FIGS. 1 and 2, 6 and 7, 11 and 12 and 19, the load-carrying part 10 essentially consists of a chassis 14 and four steering axles 16, 18, 20, 22.

The chassis 14 comprises a center longitudinal carrier 24, formed as a box girder, which extends along a vertical longitudinal median plane 26 of the load-carrying part 10, wherein two side longitudinal carriers 28, which are aligned in parallel to the longitudinal median plane 26 and are arranged on both sides of the center longitudinal carrier 24, and transverse carriers 30, which align pairwise, connect the center longitudinal carrier 24 with the side longitudinal carrier 28 and are aligned orthogonally to the vertical longitudinal median plane 26, wherein five transverse carriers 30 are arranged between each of the side longitudinal carriers 28 and the center longitudinal carrier 24.

As best seen from FIGS. 16 to 18, the flat upper surfaces of the three longitudinal carriers 24, 28 align with each other and form a load supporting surface parallel to the ground 32 for the heavy-load to be transported.

As shown in FIGS. 3, 8 and 13 by the example of the foremost transverse carrier, the transverse carriers 30 are telescopable and comprise two hollow profiles 34, 36 slid into one another and having a rectangular cross section, the outer hollow profile 34 being rigidly connected with the center longitudinal carrier 24, whereas the displaceable inner hollow profile 26 being displaceable in the interior of the outer hollow profile 34 is rigidly connected with one of the side longitudinal carriers 28.

Above of each of the four transverse carriers 30, arranged at the opposite ends of the load-carrying part 10, there is provided a holder 37 for a mobile hydraulic cylinder 38, whose cylinder tube 40 can be inserted from above into the holder 37 axially non-displaceable, thus to connect it releasably with the outer hollow profile 34 and thus with the center longitudinal carrier 24, whereas its piston rod 42 is releasably connectable via a bolt with the inner hollow profile 36 and thus with one of the two side longitudinal carrier 28, as best shown in FIG. 20. Altogether two mobile hydraulic cylinders 38 are provided, each of them can be inserted at one end of the load-carrying part 10 alternately in the one or the other holder 37. The two hydraulic cylinders 38 can be connected with a hydraulic circuit of the low-loader via fast couplings and be extended or retracted alone or synchronically via a controllable hydraulic valve (not shown) in order to make the low-loader wider or narrower at one of its sides.

The outer hollow profiles 34 of the foremost and rearmost transverse carrier 30 of the load-carrying part 10 are assembled to a box girder, which forms a coupling element 44 for coupling the load-carrying part 10 with the goose-neck 12 or with the drawbar 13 or with a further load-carrying part. The box girder is limited by a vertical front end 46 and is provided with at least two eyes 48 at its underside.

For changing the width and the track width of the load-carrying part 10, the two mobile hydraulic cylinders 38 are inserted firstly from above in the two holders 37 at one side of the center longitudinal carrier 24, to displace firstly one of the side longitudinal carrier 28. After bolting with the inner hollow profile 36, the piston rods 42 of the two hydraulic cylinders 38 are extended or retracted, to increase or decrease as required the side distance between the center longitudinal carrier 24 and the one side longitudinal carrier 28 by telescoping the associated transverse carrier 30. Afterward the two hydraulic cylinders 38 are moved and the side distance between the center longitudinal carrier 24 and the other side longitudinal carrier 28 is increased or decreased in an appropriate amount.

The outer and inner hollow profile 34, 36 of the transverse carrier 30 can be locked in relation to each other in three discrete positions, in which the width of the low-loader is about 4800 mm (189 inch), 5500 mm (126 inch) or 6100 mm (240 inch) and the track width is about 2665 mm (104, 92 inch), 3351 mm (131, 93 inch) or 3960 mm (155, 94 inch).

As shown in FIGS. 19 and 20, in order to avoid a large drag against the displacement of the side longitudinal carriers 28 due to friction forces between the wheels 50 staying on the ground and loaded with the weight of the load-carrying part, and the ground 32, the chassis 14 is lifted before the displacement of the longitudinal carrier 28. For that purpose, the load-carrying part 10 is provided with two vertical hydraulic cylinder supports 52 in the vicinity of its front end and in the vicinity of its rear end, respectively, which vertical cylinder supports are arranged on both sides of the center longitudinal carrier 24, in a corner between the latter and the outer hollow profile 34 of a transverse carrier 30. Each hydraulic support 52 comprises a cylinder tube 54 rigidly connected with the chassis 14 and a piston rod 56, which lower end is provided with an extended foot plate 58. When the piston rods 56 of the four hydraulic supports 52 are extended downwardly out of the cylinder tubes 54, firstly the foot plates 58 engage the ground 32, before the cylinder tubes 54 together with the whole chassis 14 are lifted, until the wheels 50 are not touching the ground, as shown in FIGS. 19 and 20. In this state the piston rods 42 of the hydraulic cylinders 38 above the front and rear transverse carriers 30 are extended or retracted to approximate the two side longitudinal carriers 28 to the center longitudinal carrier 24 or to move them away. After this, the piston rods 56 of the hydraulic supports 52 are retracted again to set the chassis 14 again on the wheels 50.

The steering axles 16, 18, 20, 22 consist respectively of two bogies 60, which are arranged next to each other at one of the two side longitudinal carriers 28 respectively and which are, in relation to this longitudinal carrier 28, rotatable about a rotating axis 62 vertical to the ground 32, as shown in FIG. 16. The bogies 60, which arranged in line and below each of the side longitudinal carriers 28, each carry a half-axle 64 at opposite ends of which two pairs of wheels 50 are mounted. The bogies 60 each comprise a steering arm 66 of a steering of the low-loader, which is rotatably fixed connected with the half-axle 64 and which can be pivoted about the rotating axis 62 of the bogies 60 for turning the wheels of the half-axle 64.

For pivoting of the bogies 60 serve steering cylinders 68, which are connected to a hydraulic steering circuit of the steering of the low-loader. The cylinder tube of each steering cylinder 68 is hinged respectively in the vicinity of the second steering axle 18 at one of the two side longitudinal carriers 28, whereas the piston rod acts on an additional steering arm 70, which is hinged in the center between the first and second steering axle 16, 18 at the same side longitudinal carrier 28, which is best shown in FIGS. 2, 7 and 12.

The steering arms 70 are connected to each other via a transverse track rod 72 aligned transversely to the longitudinal median plane 26, the ends of the transverse track rod are hinged at protruding projections of the two steering arms 70. The transverse track rod 72 assures that during the steering the two bogies 60 each steering axle 16, 18, 20, 22 is turned by a correct steering angle in relation to a joint steering pole and that the wheels 50 of the two half-axles 64 of each steering axle 16, 18, 20, 22 are turned with correct turning angles in relation to the steering pole.

As the transverse track rot 72 connects the two steering arms 70, which are hinged at the side longitudinal carriers 28, the distance between the hinge points of the ends of the transverse track rod 72 varies, when the two side longitudinal carriers 28 are approximated to or moved away from the center longitudinal carrier 24 for changing the width and the track width of the low-loader.

In order to compensate for this change of distance, the transverse track rod 72 is formed telescopable. As best shown in FIGS. 4 and 5, 9 and 10, as well as 14 and 15, the transverse track rod 72 consists of three elongated coaxial cylinder tubes 74, 76, 78 with different diameters, which can be slid into each other or pulled apart and which are fixable in relation to each other in three predetermined displacement positions corresponding to the three different adjustable width or track width of the low-loader. The three cylinder tubes 74, 76, 78 have approximately the same length.

At its opposite ends the transverse track rod 72 is provided with two eyes 80 serving for a hinging of the transverse track rod 72 at a projection of the respective steering arm 70, wherein the one eye 80 is attached at the outer cylinder tube 74 and the other eye 80 is attached at the inner cylinder tube 78.

For fixing the three cylinder tubes 74, 76, 78 in the three predetermined displacement positions the outer cylinder tube 74 is provided with three aligned diametrically transverse bore holes 82, 84, 86, wherein the opposite ports of two bore holes 84, 86 of the bore holes 82, 84, 86 are reinforced by a welded perforated plate 88, respectively. The center and the inner cylinder tube 76, 78 are provided with two aligned diametrically transverse bore holes 90, 92, which are only partially visible.

In the predefined displacement positions locking bolts 94, 96 can be inserted and secured through a part of the transverse bore holes 82, 84, 86, 90, 92 to fix or to lock the cylinder tubes 74, 76, 78 axially non-displaceable. For this altogether two locking bolts 94, 96 are sufficient. The locking bolts 94, 96 are at one end provided with an enlarged grip part 98 and at the other end with a releasable securing pen 100.

When the low-loader has the narrowest width and track width, as shown in FIGS. 1 to 3, all three cylinder tubes 74, 76, 78 of the transverse track rod 72 are completely slid into one another, as shown in FIGS. 4 and 5. In this state one of the two locking bolts 94, 96 traverses the center bore hole 84 of the three diametrical transverse bore holes 82, 84, 86 of the outer cylinder tube 74, as well as one diametrical transverse bore hole (not shown) of the center and the inner cylinder tube 76, 78, aligning with this transverse bore hole 84. The two locking bolts 96 traverse two aligning diametrical transverse bore holes, which are provided in the protruding ends of the outermost cylinder tube 74 of the center and the inner cylinder tubes 76, 78, wherein only the transverse bore hole 90 in the center cylinder 76 is visible.

When the low-loader has the medium width and track width, as shown in the FIGS. 6 to 8, the cylinder tube 76 of the transverse track rod 72 stays completely retracted in the outer cylinder tube 74, whereas the inner cylinder tube 78 is completely pulled out of the center 76 cylinder tube, as shown in FIGS. 9 and 10. In this state the first locking bolt 94 traverses the center bore hole 84 of the three diametrical transverse bore holes 82, 84, 86 of the outer cylinder tube 74 and one diametrical transverse bore hole (not shown) of the center cylinder tube 76 which aligns with this transverse bore hole 84. The extended inner cylinder tube 78 is held by the second locking bolt 96, which in this state traverses the transverse bore hole 90 at the end of the center cylinder tube 76 and that diametrical transverse bore hole of the inner cylinder tube 78, which was aligned with the transverse bore hole 84 in the case of the completely retracted inner cylinder tube 78.

When the low-loader has the widest width and track width, as shown in FIGS. 11 to 13, not only the inner cylinder tube 78 is completely pulled out of the center cylinder tube 76, but also the center cylinder tube 76 is completely pulled out of the outer cylinder tube 74, as shown in FIGS. 14 and 15. In this state the first locking bolt 84 traverses the diametrical transverse bore hole averted from the eye 80 and extends along the rear front end of the center cylinder tube 76, so that the latter cannot be slid again in the outer cylinder tube 74. The inner cylinder tube 78 is pulled out of the center cylinder tube 76 and is held, as before, by the second locking bolt 96, which traverses the transverse bore hole 90 at the end of the center cylinder tube 76 and the transverse bore hole (not shown) of the inner cylinder tube 78.

In order to avoid that the center cylinder tube 76 rotates about its longitudinal axis in relation to the outer or inner cylinder tube 74 or 78, it is displaceable and rotatably fixed connected to the outer and the inner cylinder tube 74, 78, for example by a form-fit wedge type connector. A rotation of the outer and inner cylinder tubes 74, 78 is prevented by the two eyes 80.

As best shown in FIGS. 2, 3, 7, 8, 12 and 13, each of the two steering arms 66, which are connected via the transverse track rods 72, is connected via a longitudinal track rod 100, 102, respectively, with the steering arm 66 of an adjacent bogie 60 of the first or second steering axle 16, 18.

The steering arms of the two bogies 60 of the third steering axle 20 are connected to the steering arms 66 of an adjacent bogie 60 of the second or fourth steering axle 18, 22 by a longitudinal track rod 104, 106, respectively.

As best seen in FIG. 20 via the example of a steering arm 66 of the first steering axle 16, the steering arms 66 of the bogies 60 of all steering axles 16, 18, 20, 22 are each provided with ten holes 108, respectively, which are arranged in different distances from the vertical rotating axis 62 of the respective bogie 60. In this manner the longitudinal track rods 100, 102, 104, 106 can be hinged at the steering arm 66 of the first, second, third and fourth steering axle 16, 18, 20, 22 by using different holes 108 and thus a desired steering ratio can be chosen for the two bogie 60 of each steering axle 16, 18, 20, 22, which is different from the steering ratio of the other steering axles 16, 18, 20, 22.

The goose-neck 12 shown in FIG. 12 can be attached at the front end of the load-carrying part 10 and comprises a generally horizontally aligned front supporting part 110 for resting onto the flat rear part of the tractor, a neck-part 112 which extends downward at the rear part of the supporting part 110, which, in relation to the supporting part 110, is pivotable about a pivot axis 111, which is orthogonal to the longitudinal median plane 26, as well as a coupling part 114 provided at the lower end of the neck-part 112, wherein the coupling part is telescopable orthogonally to the vertical longitudinal median plane 26 of the load-carrying part 10.

The supporting part 110 is provided with a swivel coupling element (not shown) at its underside, which can be coupled in a known manner to a complementary swivel coupling element of the tractor, so that the goose-neck 12 is rotatable in relation to the tractor about an axis orthogonal to the ground 32.

The neck part 112 comprises two vertical hydraulic cylinders 116, where their cylinder tubes 118 are hinged at a distance from the pivot axis 111 at the rear end of the supporting part 110, whereas their piston rods 120 are hinged at the lower end of the neck-part at a greater distance from the pivot axis 111. The neck-part 112 can be pivoted about the pivot axis 111 in relation to the supporting part by extending and retracting the piston rods 120, in order to adjust the height of the coupling part 114 above the ground 32 to the height of the coupling element 44 at the opposite end of the load-carrying part 10, when coupling with the load-carrying part 10.

The width adjustable coupling part 114 comprises a hollow center part 122 which can be rigidly coupled with the coupling element 44 at the front end of the load-carrying part 10, as well as two side parts 124 which can be extended transversely to the driving direction or longitudinal median plane 26 from the hollow center part 122 and can be rigidly connected with adjacent inner hollow profile 36 of the two transverse carriers 30 at the front end of the load-carrying part 10, in order to increase the torsion-resistance.

The center part 122 consists essentially of a box girder transversely aligned to the driving direction, in which the two side parts 124 are displaceably and extendably guided, as well two eyes 126 arranged at the underside of the box girder. The side distance of the eyes 126 corresponds the center distance of the pairs of eyes 48 of the coupling element 44 at the front end of the load-carrying part 10, so that the eyes 126 can be inserted between the two eyes 48 of each eye pair, respectively and can be coupled to the eyes 48 via an axially displaceable coupling bolt 128. The coupling bolt 128 is formed by a free end of a piston rod of a hydraulic cylinder 130 arranged in the extension of the center axis of the eyes 126.

A bar 132 is welded at the upper side of the center part 122 through which bore holes 134 extend, which are aligned in driving direction. After the coupling of the eyes 48, 126 by means of the coupling bolt 128, through these bore holes 134 as well as through aligned bore holes 136 of the coupling elements 44 (FIG. 20) connecting screws can be set and countered to screw the center part 122 with the coupling element 44. Corresponding bore holes 138 are provided in a block 140 at the upper side of the side parts 124 and in a block 142 of the upper side of the inner hollow profiles 36 of the transverse carrier 30 at the ends of the load-carrying part 10, so that these can also be screwed together by connecting screws, when the bore holes 138 align with each other.

After the coupling of the goose-neck 12 with the load-carrying part 10 the two hydraulic cylinders 116 are coupled hydraulically to the hydraulic cylinders (not shown) of a part of the bogie 60, in order to transfer in this manner lifting movements of the chassis 14 and hydraulic forces of the hydraulic cylinders of the bogies 60 onto the two hydraulic cylinders 116. Thus, the rotating coupling element at the underside of the supporting part 110 always presses with a defined force onto the rotating coupling element of the tractor and therefore transfers a constant force onto the tractor.

Instead of the goose-neck 12 in FIG. 21, also the drawbar 13 shown in FIG. 22 can be coupled to the load-carrying part 10. For this, the drawbar 13 comprises at its end opposite to the tractor a coupling element 142, which is rigidly connectable with the coupling element 44 of the load-carrying part 10, which however is, unlike the coupling part 44 of the goose-neck 12, not telescopable.

The coupling element 142 comprises two elements 144, 146, which in relation to each other are pivotable about a vertical pivot axis 148, as well as four hydraulic cylinders 150, which are arranged on both sides of the longitudinal median plane 26 pairwise between the elements 146, 148. The hydraulic cylinders 150 have a piston rod 152 hinged at the element 144 and a cylinder tube 154 hinged at the element 146, respectively. The element 144 is, in relation to a drawbar part 156 of the drawbar 13, pivotable about an axis parallel to the ground 158. The element 146 comprises a vertical plate 160, which can be brought into contact with the front end 46 of the coupling element 44 of the load-carrying part 10 and can be coupled to the coupling element 44 by screwing. After the coupling the hydraulic cylinders 150 are coupled hydraulically with a hydraulic steering circuit of the steering axles 16, 18, 20, 22, so that the desired turning angle is also realized between the elements 144 and 146.

In FIGS. 23 to 27 a second embodiment of a load-carrying part 10' of a transport vehicle, such as a low-loader, with variable width and track width is shown, which corresponds in its basic design to the first embodiment, so that corresponding parts are provided with the same reference signs and are not described again. The load-carrying part 10' of the second embodiment corresponding to the load-carrying part 10 of the first embodiment thus comprises a chassis 14 too, having four steering axles 16, 18, 20, 22. Again, the chassis 14 comprises a center longitudinal carrier 24 formed as a box girder which extends along a vertical longitudinal median plane 26 of the load-carrying part, two side longitudinal carriers 28, which are aligned parallel to the longitudinal median plane 26 and are arranged on both sides of the center longitudinal carrier 24, as well as six transverse carriers 30', which pairwise align, connect the center longitudinal carrier 24 with the side longitudinal carriers 28 and are orthogonally aligned to the vertical longitudinal median plane 26, wherein six transverse carrier 30' are arranged between each of the side longitudinal carriers 28 and the center longitudinal carrier 24.

As described before, the transverse carriers 30' of the second embodiment corresponding to transverse carriers 30 of the first embodiment are telescopably formed and comprise two hollow profiles 34, 36 slid into one another having a rectangular cross-section, each outer hollow profile 34 being rigidly connected with the center longitudinal carrier, whereas the inner hollow profile 36 being displaceable in the inner of the outer hollow profile 34 of the first embodiment is rigidly connected with a side longitudinal carrier 28. By the displacement of the inner hollow profile 36 relatively to the outer hollow profile 34 the distance of the two side longitudinal carriers 28 and thus the distance of the bogies 60 arranged at one of the two side longitudinal carriers is variable. In the second embodiment it is provided that the transverse carriers 30' are formed non-telescopic, thus they have a predetermined length. In order to vary the distance of the opposite bogies 60 of the steering axles 16, 18, 20, 22 and thus the width of the load-carrying part 10, it is provided in the second embodiment, that the side longitudinal carrier 28 is arranged in a displaceable manner along the transverse carriers 30'. As can be seen from FIGS. 23, 24 and 26, for this the side carriers 28 comprise displacement elements 28', which on the one side are fixedly connected to the respective longitudinal carrier 28 and on the other side are displaceably guided in the transverse carriers 30'. FIG. 23 shows the load-carrying part 10' of the second embodiment in a position, which corresponds to the narrowest width and track width of the load-carrying part 10'. It can be seen, that the displacement elements 28' on both side longitudinal carriers 28 are more distant from the outer end of the transverse carrier 30' as it is shown in FIG. 24, in which the load-carrying part 10' is shown in its widest width and track width setting. In the front view of FIG. 25 that widest setting is shown as dotted line.

Such a measure has the advantage that hereby in a simple manner an adjustment of the width and track width of the load-carrying part 10' can be performed also in a loaded state. For this it can be provided, that—as described according to FIGS. 19 and 20 of the first embodiment—the load-carrying part 10' in the vicinity of its front end and in the vicinity of its rear end is provided with two respective vertical hydraulic supports (not shown). Because here the transverse carriers 30' are fixedly connected with the longitudinal carrier 24 and are formed non-telescopic, it is also possible, that the lifting of the chassis 14 can be performed by hydraulic supports (not shown), corresponding in their function to the hydraulic supports 52, which are arranged at the transverse carrier 30'.

It is however also possible, that by means of an external lifting device the transverse carriers 30' are supported and that the chassis 14 can be lifted until the wheels 50 of the bogies 60 do not touch the ground. If the chassis 14 is lifted via the transverse carriers 30', the two side longitudinal carriers 28 carrying the bogies 60 lower slightly and thus do not touch the load carried by the load-carrying part 10'. Thus, an adjustment of the width and track width of the bogies 60 is possible in a simple manner, which leads to a reduced setup time and reduced workload when adjusting the width and the track width.

A further advantage of the described method is, that thus a stable and resistant connection between the center longitudinal carrier 24 and the transverse carriers 30' can be formed, as the transverse carriers 30' need not to be varied in their length for adjustment of the width and track width. Thus, it is possible, that—as can be seen from FIGS. 23 and 24—a supporting element 30a' is provided at each transverse carrier 30', which, starting from the center longitudinal carrier 24, supports the transverse carriers 30'. Because—as best seen in FIGS. 23 and 24—below the transverse carriers 30' there has to be provided only as much space, so that the wheels 50 of the bogies 60 of the longitudinal axles 16, 18, 20, 22 in its narrowest setting can be arranged below the transverse carriers 30', these supporting elements 30a' can be formed to extend far in the direction of the transverse carrier 30'.

In the afore-given description it has been assumed, that the load-carrying part 10 of the first embodiment has telescopic transverse carriers 30 and the load-carrying part 10' of the second embodiment has transverse carriers 30' which cannot be varied in their length. For the skilled person, however, it is clear that it is possible to combine these two measures.

The invention claimed is:

1. A transport vehicle with variable width and track width, the transport vehicle comprising:
   a chassis; and
   at least one steering axle,
   wherein the chassis comprises two chassis parts each carrying a row of bogies being arranged one after the other and being adjustable transversely to a vertical longitudinal medium plane of the transport vehicle,
   wherein only a single length-adjustable transverse track rod is arranged between the two rows of bogies of the two chassis parts, and the transverse track rod connects two bogies of one of the at least one steering axles, and
   wherein a length of the transverse track rod is adjustable by an amount corresponding to the amount of enlargement or reduction of the width and track width of the transport vehicle, that each of the steering arms connected via the transverse track rod is connected via a longitudinal track rod with a steering arm of an adjacent bogie of the same row.

2. The transport vehicle according to claim 1, wherein at least one steering arm of one bogie in each row is connected via two longitudinal track rods with steering arms of two adjacent bogies of the same row.

3. The transport vehicle according to claim 1, wherein the transverse track rod is telescopable and comprises at least two tube-like elements which are displaceable in relation to each other in direction of the longitudinal axis of the transverse track rod and are fixable in a predefined displacement position.

4. The transport vehicle according to claim 3 wherein the transverse track rod comprises at least three tube-like elements which are displaceable in relation to each other in direction of a longitudinal axis of the transverse track rod and are fixable in a predefined displacement position.

5. The transport vehicle according to claim 3, wherein the adjacent tube-like elements are fixable in relation to each other only in a completely retracted or completely extended displacement position.

6. The transport vehicle according to claim 3, wherein a length difference between the displacement positions corresponds to the amount of the changing of the track width and width.

7. The transport vehicle according to claim 3, wherein the tube-like elements are fixable via locking bolts (94, 96) which extend through aligned transverse track rods of at least two of the tube-like elements.

8. The transport vehicle according to claim 1, wherein means for lifting the chassis before changing the width and the track width.

9. The transport vehicle according to claim 8, wherein at least one mobile hydraulic cylinder for moving the two chassis parts, wherein the mobile hydraulic cylinder is alternately applicable between a center chassis part and the one or the other of the two chassis parts.

10. The transport vehicle according to one claim 1, wherein the chassis comprises a center longitudinal carrier and at least one, preferably two side longitudinal carriers whose distance to the center longitudinal carrier is variable, and that the center longitudinal carrier and at least one of the side longitudinal carriers are connected to each other via transverse carriers.

11. The transport vehicle according to claim 10, wherein at least one transverse carrier is formed telescopable.

12. The transport vehicle according to claim 10, wherein at least one side longitudinal carrier is displaceably arranged at the transverse carriers.

13. The transport vehicle according to claim 1, wherein a load-carrying part and a goose-neck connected with the load-carrying part, whose width can be adjusted according to the amount of enlargement or reduction of the track width and width of the load-carrying part.

14. The transport vehicle according to claim 13, wherein the goose-neck comprises a coupling element releasably connectable with the load-carrying part, which comprises two side parts which are displaceable transversely to the longitudinal medium plane of the transport vehicle and are rigidly connectable with the chassis parts.

15. The transport vehicle according to claim 13, wherein the goose-neck comprises two parts which are, in relation to each other, hydraulically controllably pivotable about a pivot axis orthogonal to the longitudinal medium plane.

16. The transport vehicle according to claim 1, wherein a load-carrying part and a drawbar connected with the load-carrying part.

17. Transport vehicle according to claim 16, wherein the drawbar comprises two elements which are, in relation to each other, hydraulically controllably pivotable about a pivot axis orthogonal to the ground.

* * * * *